(12) United States Patent
Koyama (10) Patent No.: US 6,563,815 B1
(45) Date of Patent: *May 13, 2003

(54) PACKET COMMUNICATION SYSTEM (75) Inventor: Toshiaki Koyama, Zama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/238,160

(22) Filed: Jan. 28, 1999

Related U.S. Application Data (63) Continuation of application No. 08/827,054, filed on Mar. 26, 1997, now abandoned, which is a continuation of application No. 08/436,183, filed on May 9, 1995, now Pat. No. 5,654,957.

(30) Foreign Application Priority Data

May 12, 1994 (JP) .............................................. 6-098508

(51) Int. Cl.[7] ........................... G01R 31/08; H04L 1/00; H04L 12/66; H04L 12/50; H04Q 11/00
(52) U.S. Cl. ....................................... 370/352; 370/216
(58) Field of Search ................................ 370/216, 352, 370/353, 354, 356, 401, 465, 237, 217, 218, 242; 379/93.07, 221, 93.14, 93.09, 900, 93.06; 320/228, 227; 340/827

(56) References Cited

U.S. PATENT DOCUMENTS

| 4,486,878 | A | | 12/1984 | Havermans ................. 370/352 |
|---|---|---|---|---|
| 4,539,676 | A | | 9/1985 | Lucas ......................... 370/354 |
| 4,878,240 | A | | 10/1989 | Lin et al. ................... 379/88.22 |
| 5,042,062 | A | | 8/1991 | Lee et al. ..................... 370/384 |
| 5,127,003 | A | | 6/1992 | Doll, Jr. et al. .............. 370/259 |
| 5,216,704 | A | | 6/1993 | Williams et al. .......... 379/93.08 |
| 5,406,564 | A | * | 4/1995 | Okita .......................... 370/228 |
| 5,455,859 | A | * | 10/1995 | Gutzmer ................... 379/93.09 |
| 5,467,390 | A | | 11/1995 | Brankley et al. ............ 379/229 |
| 5,537,461 | A | * | 7/1996 | Bridges et al. ................ 379/88 |
| 5,654,957 | A | | 8/1997 | Koyama ...................... 370/355 |
| 5,774,527 | A | * | 6/1998 | Handelman et al. ...... 379/93.07 |
| 5,838,665 | A | * | 11/1998 | Kahn et al. .................. 370/260 |
| 5,892,764 | A | * | 4/1999 | Riemann et al. ............ 370/401 |
| 5,970,126 | A | * | 10/1999 | Bowater et al. ............. 379/221 |
| 6,130,893 | A | * | 10/2000 | Whittaker et al. ........... 370/420 |
| 6,144,724 | A | * | 11/2000 | Stovall ..................... 379/93.05 |
| 6,175,565 | B1 | * | 1/2001 | McKinnon et al. .......... 370/354 |

* cited by examiner

*Primary Examiner*—Dang Ton
*Assistant Examiner*—Kevin C. Harper
(74) *Attorney, Agent, or Firm*—Mattingly, Stanger & Malur, P.C.

(57) ABSTRACT

The packet communication system enables communication between a communication unit connected in a conventional telephone network and a communication unit in a packet mode network. A device for exclusively selecting the connection network is provided so that, at the time of transmission of a signal from one communication unit to another, the connection path is selected according to the kind of the network to which the other communication unit belongs. At the time of signal reception, the communication unit is connected to only one of the conventional telephone network and the packet mode network. The packet communication system includes a packet processor for converting an information signal, such as speech, inputted from an input unit (for example, a transmitter microphone of a handset) into the form of a packet. The packet is transmitted to the packet mode network and converted into the original information signal stream to reproduce the signal stream by an output unit (for example, a receiver of the handset). A conventional telephone network interface controller is provided for reproducing the speech or like information signal received from the conventional telephone network by the output unit. An exclusive selector selects either the conventional telephone network or the packet mode network at the time of signal reception.

13 Claims, 4 Drawing Sheets

WHEN POWER SUPPLY IS INTERRUPTED

FIG. 1

FIG. 3A WHEN POWER SUPPLY IS INTERRUPTED

FIG. 3B WHEN MAKING INTERNAL LOGICAL OPERATION

FIG. 4
PRIOR ART

PACKET COMMUNICATION SYSTEM

This is a continuation application of U.S. Ser. No. 08/827,054, filed Mar. 26, 1997 now abandoned, which is a continuation application of U.S. Ser. No. 08/436,183, filed May 9, 1995 now U.S. Pat. No. 5,654,957.

BACKGROUND OF THE INVENTION

This invention relates to a packet communication system used for packet mode communication of a signal, such as, an audio signal or a video signal through a communication network, and more particularly to a packet communication system suitable for packet mode communication of a signal, such as, a speech signal between communication networks using signal types different from each other.

With the recent progress of the architecture of a LAN (local area network), the network system connecting small size computers, such as, personal computers using the LAN is also increasing. Thus, an attempt is now being made for integration of communications by permitting voice communication on the LAN too in addition to a conventional telephone network (including a PBX network that is a private branch exchange network).

Figure 4:
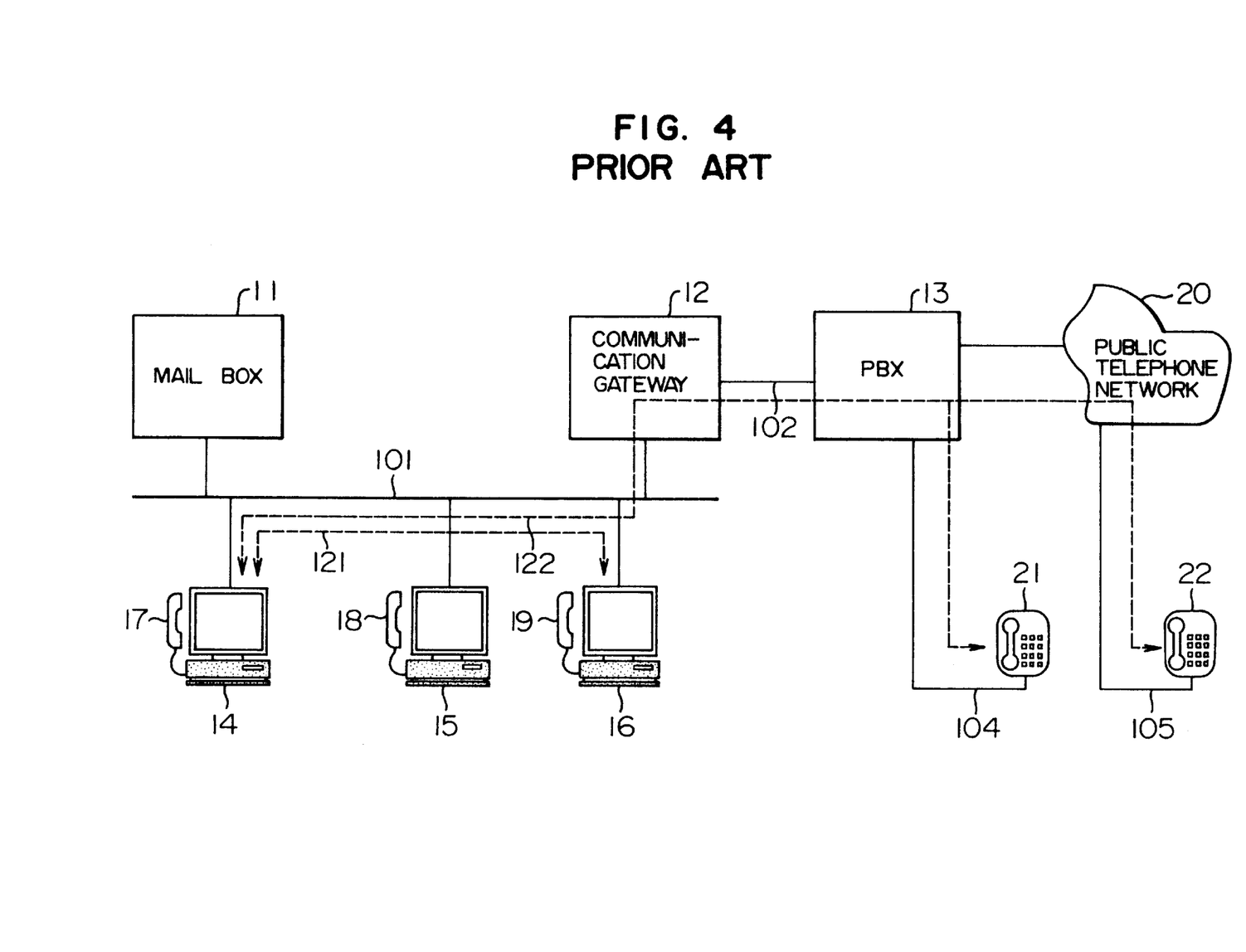
FIG. 4 shows the structure of one form of a prior art packet communication system.

As an example of such an attempt, there is a "voice communication system" as shown in FIG. 4. This voice communication system is composed of telephones connected to a conventional telephone network, packet communication units connected to a packeted speech signal communication network (referred to hereinafter as a packet communication network), and a communication gateway used to realize mutual connections between the telephones and the packet communication units. A network carrying such a speech packet on the LAN described above is an example of the packet communication network.

Referring to FIG. 4, the reference numerals 21 and 22 designate telephones connected to a private branch exchange network (a PBX network) 13 and a public telephone network 20, 104 designates a subscriber line of the private branch exchange network 13, 105 designates a subscriber line of the public telephone network 20, and they have the same interface. On the other hand, the reference numeral 101 designates a packeted speech signal transmission network in the form of, for example, a LAN based on the CSMA/CD (carrier sense multiple access with collision detection) scheme according to the standards defined in the IEEE 802. 3. A plurality of packet communication units 14, 15 and 16 are connected to this LAN 101.

The packet communication units 14, 15 and 16 are in the form of small size computers, such as, personal computers provided with handsets 17, 18 and 19 respectively. These packet communication units 14, 15 and 16 have, on one hand, functions of packeting speech signal inputs from the handsets 17 to 19 and sending out the packeted speech signals onto the LAN 101 and, on the other hand, functions of converting the packeted speech signals received via the LAN 101 into ordinary voice streams again and reproducing the original speech by the handsets 17, 18 and 19.

The reference numeral 11 designates a mail box connected to the LAN 101 to store a filed voice mail. The packet communication units 14, 15 and 16 can store such filed voice mails in the mail box 11 through the LAN 101 and can also fetch such voice mails, transmitted from the other packet communication units and stored in the mail box 11, so as to internally convert the stored voice mails into voice streams again and reproduce the original speech signals by the handsets 17, 18 and 19.

The reference numeral 12 designates a communication gateway which controls communication between the LAN 101 that is the packet communication network and the private branch exchange network 13 that is the conventional telephone network. In this case, a subscriber line accommodating an existing telephone is commonly used as a connection line 102 between the private branch exchange network 13 and the communication gateway 12. However, this connection line 102 may be an interface between the telephones in the private branch exchange network.

Suppose now the case where voice communication is made among the packet communication units 14, 15 and 16 in the LAN 101 in the voice communication system having the structure described above. In the case of making voice communication between, for example, the packet communication units 14 and 16, the speech packet is transferred through a communication path 121. On the other hand, in the case of making communication between the packet communication unit 14 and the private branch exchange network 13 or the telephone 21 or 22 connected to the public telephone network 20, the speech packet is transmitted through a communication path 122 in the LAN 101. In this case, the packeted speech signal on the LAN 101 is converted by the communication gateway 12 into the corresponding voice stream before being transferred to the private branch exchange network 13 or the public telephone network 20. In the case of a speech signal transmitted from the side of the private branch exchange network 13 or the public telephone network 20 toward the packet communication unit 14 in the LAN 101, its voice stream is packeted by the communication gateway 12 to be sent out to the LAN 101.

In the case of integration of voice communication in a packet communication network in the form including a conventional telephone network, it is an undeniable fact that the number of users having their telephones connected to the conventional telephone network is actually predominantly large although the number of terminals connected to the packet communication network is increasing. Therefore, when the desired integration of the voice communication is considered, the amount of communication between the telephones connected to the conventional telephone network and the terminals connected to the packet communication network is expected to considerably increase.

On the other hand, when the future of the packet communication network is reviewed, an undeniable situation will appear in which the users possessing their telephones already become new members of the packet communication network. For example, although specific users, such as, persons holding administrative positions in a company only possess the packet communication units in the LAN in the company at present, it is apparent that there will be an increasing tendency of introducing the packet communication units in future so that all the members of the company can possess the packet communication units.

However, the prior art packet communication units connected in the packet communication network are basically considered to make communication in packet form. Thus, the desired integration of the voice communication in the form including the conventional telephone network will bring forth such a problem that the communication gateway tends to be overloaded due to concentration of loads, resulting in impossibility of connection or communication.

Further, when the packet communication unit is newly provided for the user possessing his telephone already, the same user possesses both the telephone and the packet communication unit. As a result, the cost inevitably increases, and such a problem arises that the user cannot deal with simultaneous occurrence of a communication request from both the telephone and the packet communication unit. The same applies also to the case where the telephone is newly provided for the user who possesses the packet communication unit only.

SUMMARY OF THE INVENTION

It is an object of the present invention to provide a packet communication system which can reliably and economically ensure communication between communication units connected in a conventional telephone network and those connected in a packet mode network.

Another object of the present invention is to provide a packet communication system which is constructed to be accommodated in the prior art network by adding a function of connection to the conventional telephone network in addition to the function of connection to the packet mode network, so as to lighten loads imposed on a communication gateway, to decrease the amount of materials of an interface circuit or parts for connection to the conventional telephone network, and to reduce the cost of the system.

Still another object of the present invention is to provide a packet communication system in which a user possessing his telephone already can transmit speech through his telephone subscriber line possessed already and which also makes it possible to make voice communication with another packet communication unit connected in the packet mode network.

Yet another object of the present invention is to provide a packet communication system which, when an incoming call arrives at the user's packet communication unit from another while the user is talking, displays the arrival of the incoming call on a display, so that such a call can be dealt with while the other party does not know the fact.

A further object of the present invention is to provide a packet communication system in which a speech or like signal arriving at the user's packet communication unit from the conventional telephone network is turned into mail form without the necessity for re-connection of the input to the communication gateway, so as to shorten the period of time required for turning the input into the mail form and also to lighten the load imposed on the communication gateway.

A still further object of the present invention is to provide a packet communication system in which, even in the event of sudden power supply interruption, an output unit, such as, an externally located telephone is used for communication, so that, even when the exclusive user of the packet communication unit is absent, and the power supply is not turned on, another person can respond to the input.

The present invention which attains the above objects provides a packet communication system making communication between a communication unit connected in a conventional telephone network and that in a packet mode network, in which a function of connection to the conventional telephone network is added to a function of connection to the packet mode network, and means for exclusively selecting the connection network is provided so that, at the time of transmission of a signal from one of the communication units to the other, the connection path is selected according to the kind of network to which the other communication unit belongs, while, at the time of signal reception, the communication unit is connected to only one of the conventional telephone network and the packet mode network. That is, the packet communication system comprises packet processor means for converting a speech or like information signal inputted from an input unit (for example, a transmitter microphone of a handset) into the form of a packet to transmit the packet to the packet mode network and converting the packet transmitted from the packet mode network into the original speech or like information signal stream to reproduce the signal stream by an output unit (for example, a receiver of the handset), conventional telephone network interface control means for reproducing the speech or like information signal arrived from the conventional telephone network by the output unit, and exclusive selection means for exclusively selecting only one of the conventional telephone network and the packet mode network in response to the arrival of the input signal.

Thus, in the case of communication between the communication unit connected in the packet mode network and the communication unit, such as, the telephone connected in the conventional telephone network, a connection path is formed between them by the function of connection to the conventional telephone network. On the other hand, in the case of communication between the communication units in the packet mode network, a communication path is formed between them by the function of connection to the packet mode network. Therefore, the communication gateway is utilized only for the communication between the communication unit (for example, the telephone) connected to the conventional telephone network only and the communication unit connected to the packet mode network only, and concentration of loads on the communication gateway is avoided. Thus, even when the number of the communication units connected in the conventional telephone network may be large, information, such as, audio information and/or video information can be reliably communicated between the communication units in the conventional telephone network and those in the packet mode network.

Further, when the packet communication unit is newly provided for the user possessing his telephone already connected to the conventional telephone network, the sole requirement is to connect the subscriber telephone line to the packet communication system of the present invention, so that the telephone can be eliminated, and communication of information, such as, audio information and/or video information can be economically attained. When, in this case, information signals are simultaneously inputted from the communication unit connected in the packet mode network and that in the conventional telephone network, only one of the input signals is connected to the user's communication unit, and a busy tone is issued for the other input signal, so that the user does not feel any difficulty in dealing with such a situation.

BRIEF DESCRIPTION OF THE DRAWINGS

These and other objects, and features of the present invention will become apparent from the following detailed description of preferred embodiments of the present invention when read in conjunction with the drawings.

DESCRIPTION OF THE PREFERRED EMBODIMENTS

Preferred embodiments of the present invention will now be described in detail by reference to the drawings.

Figure 1:
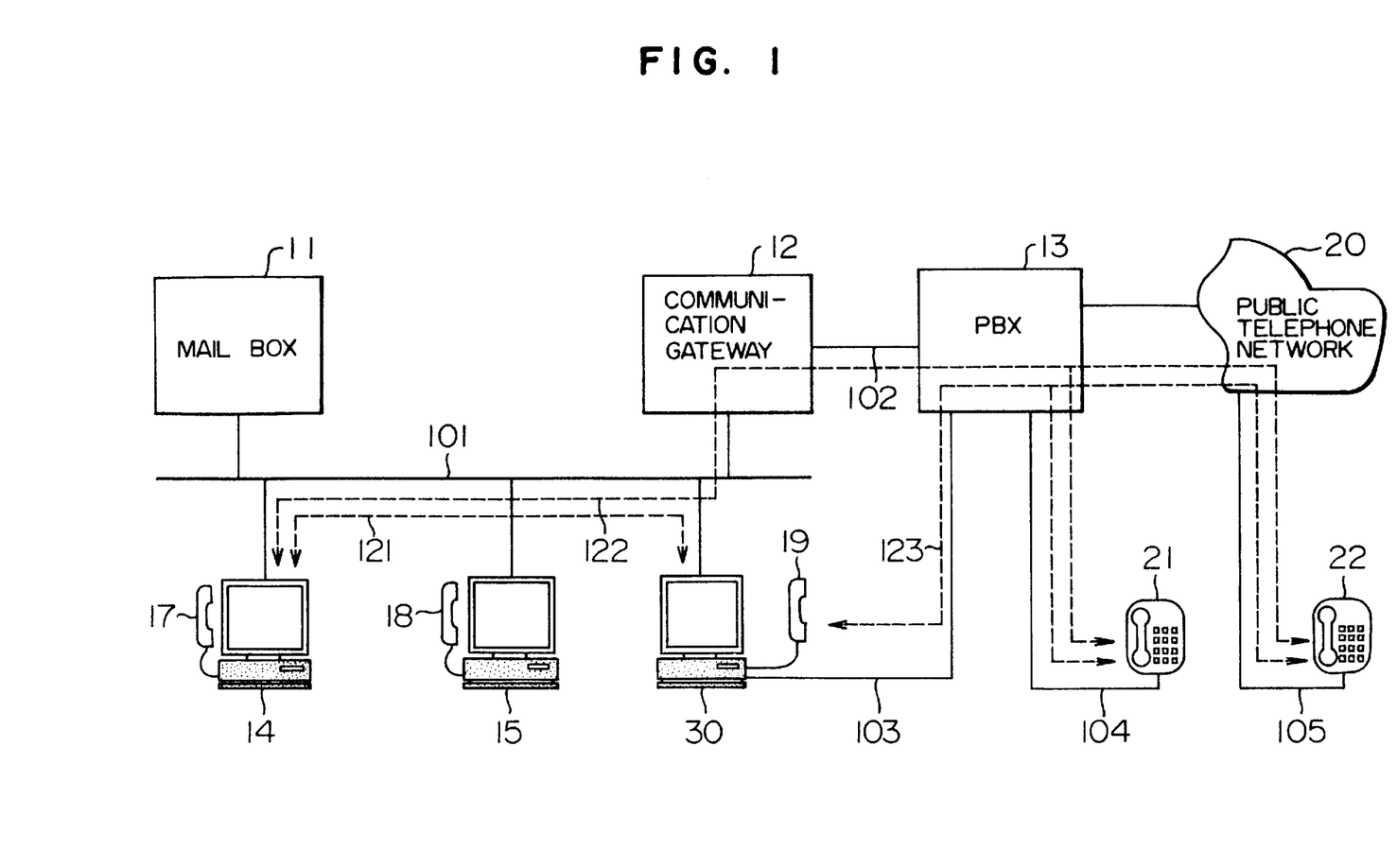
FIG. 1 shows the system structure of an embodiment of the packet communication system using the packet communication unit according to the present invention.

FIG. 1 shows the system structure of an embodiment of the packet communication system using the packet communication unit according to the present invention, and like reference numerals are used in FIG. 1 to designate like parts appearing in FIG. 4. Referring to FIG. 1, the reference numeral 30 designates a packet communication unit having a function of connection to both a conventional telephone network and a LAN 101 that is a packet communication network. The packet communication unit 30 is provided with a connection path for connection to the LAN 101 and a connection interface line 103 for connection to a private branch exchange network 13 that is the conventional telephone network. The connection interface line 103 provides the same interface as that for subscriber lines connected to telephones 21 and 22. The connection interface line 103 may be connected to a public telephone network 20 instead of the private branch exchange network 13. However, for the convenience of description, it is supposed herein that the connection interface line 103 is connected to the private branch exchange network 13.

Figure 2:
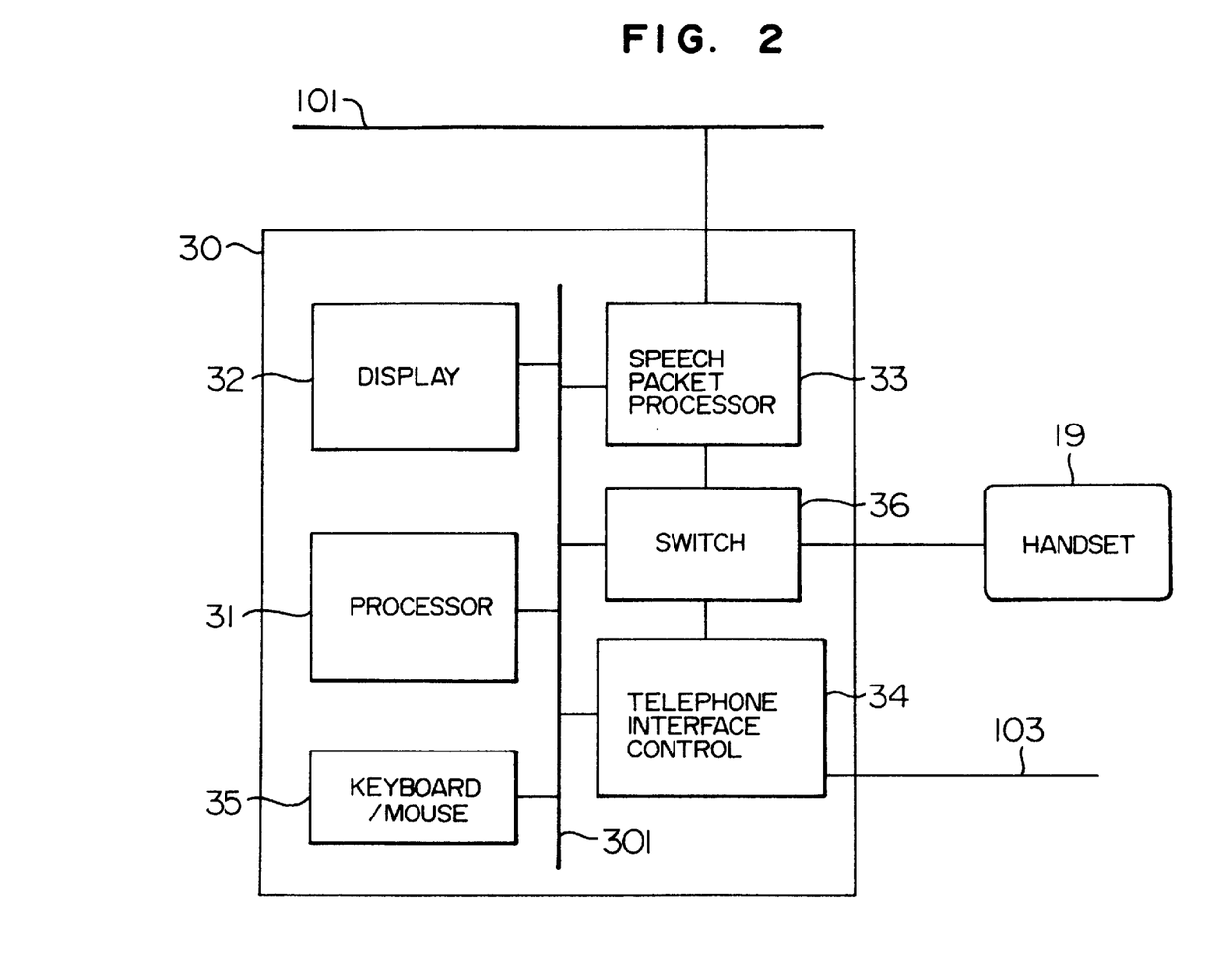
FIG. 2 is a block diagram showing in detail the structure of the packet communication unit used in the illustrated embodiment of the present invention.

FIG. 2 shows in detail the structure of the packet communication unit 30. The packet communication unit 30 is composed of a processor part 31 executing overall control, a display part 32 displaying various kinds of messages, for example, arrived messages, scenes, for example, address input scenes, etc., viewed by the user for the selection of the other party, a keyboard/mouse part 35 inputting information required for operation, a speech packet processor part 33 processing a speech input and a speech output to and from a handset 19 so as to transmit and receive a speech packet to and from the LAN 101, a telephone interface control part 34 controlling the subscriber line interface of the conventional telephone network, and a switch part 36 switched over to select whether the speech stream to the handset 19 is to be supplied from the side of the LAN 101 or from the side of the private branch exchange network 13. These parts are interconnected with each other by a bus 301.

In response to the signal arrival information supplied from the speech packet processor part 33 or from the telephone interface control part 34, the processor part 31 decides whether the communication unit of the other party is connected to the LAN 101 or to the private branch exchange network 13 and executes processing (for example, the exclusive control of the switch part 36) according to the result of decision. At the same time, according to the network to which the communication unit of the other party transmitting the signal is connected, the processor part 31 instructs the speech packet processor part 33 or the existing telephone interface control part 34 to originate a call. Also, the processor part 31 controls the switch part 36 to control the speech stream to be connected to the handset 19.

The packet communication unit 30 incorporated in this embodiment uses a communication path 121 when it communicates with, for example, a packet communication unit 14 located on the LAN 101, while it uses another communication path 123 when it communicates with the telephones 21 and 22 connected to the conventional telephone network. Whether the communication unit of the other party is located on the LAN 101 or connected to the private branch exchange network 13 is decided on the basis of whether an identifier specifying the communication unit of the other party is a network address or a telephone number. Then, on the basis of the result of the decision, the packet communication unit 30 selects the connection path.

When, for example, the communication unit of the other party transmitting the call is the telephone 21, the processor part 31 identifies according to the telephone number that the communication unit of the other party is connected in the private branch exchange network 13, and the dial signal is generated from the telephone interface control part 34. When, on the other hand, the communication unit of the other party transmitting the signal is the packet communication unit 14, the processor part 31 identifies according to the network address that the communication unit of the other party is located on the LAN 101, and the speech packet processor part 33 transmits the packet including the address of the other party. As this network address, the IP (internal protocol) address, the host name of the packet communication unit or the like is used. Whether the identifier used for specifying the unit transmitting the signal is the telephone number or the network address is decided on the basis of the rule for designating the identifier of the unit to which the signal is transmitted. Further, when it is so defined that the signal is transmitted through the communication gateway 12 when the identifier of the unit to which the signal is transmitted indicates the value in which the identifier allocated to the communication gateway 12 is added to the head of the telephone number, the packet communication unit 30 can communicate through the communication gateway 12 with the telephones 21 and 22 connected to the conventional telephone network. The network address or the telephone number of the communication unit transmitting the signal is inputted from the keyboard/mouse part 35 and displayed on the display part 32 of the packet communication unit 30.

The packet communication unit 14 in the prior art packet communication network must use the communication path 122 extending through the communication gateway 12 when it makes communication with the telephones 21 and 22 connected to the conventional telephone network only, as shown in FIG. 4. The practical mode in which the packet communication unit 30 is newly introduced to be provided for the user who possesses the existing telephone already will now be considered. In the case of the illustrated embodiment, a bypass route in the form of the connection interface line 103 directly connecting the packet communication unit 30 and the telephones 21 and 22 to the private branch exchange network 13 is provided as shown in FIG. 1, so that the load imposed on the communication gateway 12 can be greatly lightened.

The manner of exclusive control for the communication path in the packet communication unit 30 will now be described. The processor part 31 in the packet communication unit 30 can recognize the state of both of the private branch exchange network 13 and the LAN 101 through the speech packet processor part 33 or the telephone interface control part 34. Therefore, when a speech signal arrives while the packet communication unit 30 is making communication, that signal is dealt with as in the case of usual busy mode processing by the exclusive control function.

More concretely, when the packet communication unit 30 starts to make communication with the telephone 21 connected to the private branch exchange network 13, the processor part 31 changes over the switch part 36 to supply the speech input to the telephone interface control part 34 and cuts off the supply of the speech input from the speech packet processor part 33. When another speech signal arrives from the other packet communication unit 14 under the above situation, the processor part 31 generates a packet indicating that the packet communication unit 30 is now busy, and this packet is transmitted from the speech packet processor part 33 to the signal transmitting packet communication unit 14 through the LAN 101.

On the other hand, when the packet communication unit 30 starts to make communication with the other packet communication unit 14 connected to the LAN 101, the processor part 31 changes over the switch part 36 to supply the speech input to the speech packet processor part 33 and cuts off the supply of the speech input from the telephone interface control part 34. When another speech signal arrives from the telephone 21 connected to the private branch exchange network 13 under the above situation, the processor part 31 instructs the telephone interface control part 34 to generate a busy tone signal, and this signal is transmitted to the signal transmitting telephone 21 through the connection interface line 103 and the private branch exchange network 13.

The packet communication unit 30 operates to effect the above manner of exclusive control for a speech signal that arrives during communication, so that the user of the packet communication unit 30 is required to respond to the signal arriving from one of the networks only and is thus freed from such a situation in which he is embarrassed with simultaneous arrival of speech signals from both the networks. When a speech signal arrives during communication by the packet communication unit 30, the processor part 31 displays the arrival of the signal on the display part 32. In this case, the switch part 36 may be changed over by the user who viewed and confirmed the display on the display part 32.

The voice mail transfer function will now be described. When a speech signal transmitted from, for example, the telephone 21 to the packet communication unit 30 through the private branch exchange network 13 is processed to be received as a speech mail due to, for example, the absence of the user of the packet communication unit 30, the speech signal received through the connection interface line 103 is turned into the speech file by the speech packet processor part 33 and is then transferred through the LAN 101 to a mail box 11 to be stored as the mail whose destination is the user's packet communication unit 30. Thus, as in the case of an automatic answering telephone set, the speech signal arrived during the period of absence of the user of the packet communication unit 30 can be reproduced at any desired later time, so that the processing required for turning the speech signal into the speech mail via the communication gateway 12 is now unnecessary, and the period of time required for the processing can be shortened together with lightening of the load on the communication gateway 12.

Figure 3A:
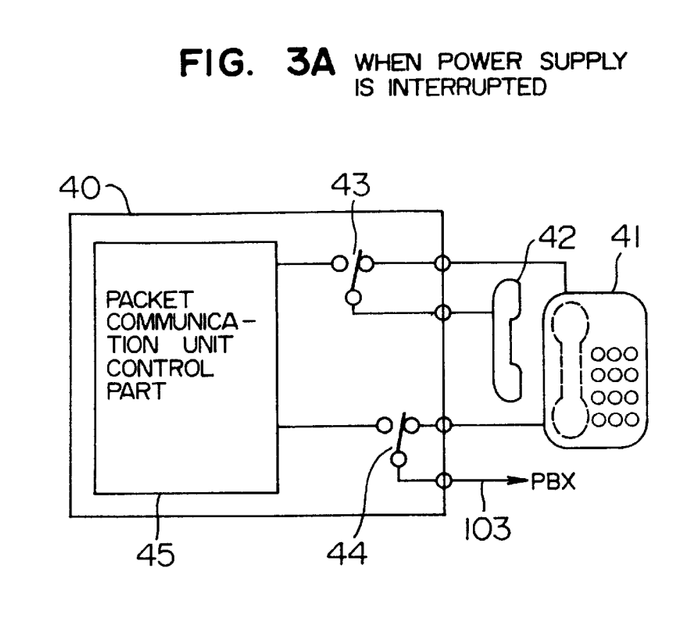
FIGS. 3A and 3B show the structure of the packet communication unit provided with a connection switching circuit for switching over connection with an externally located telephone in the event of power supply interruption.
Figure 3B:
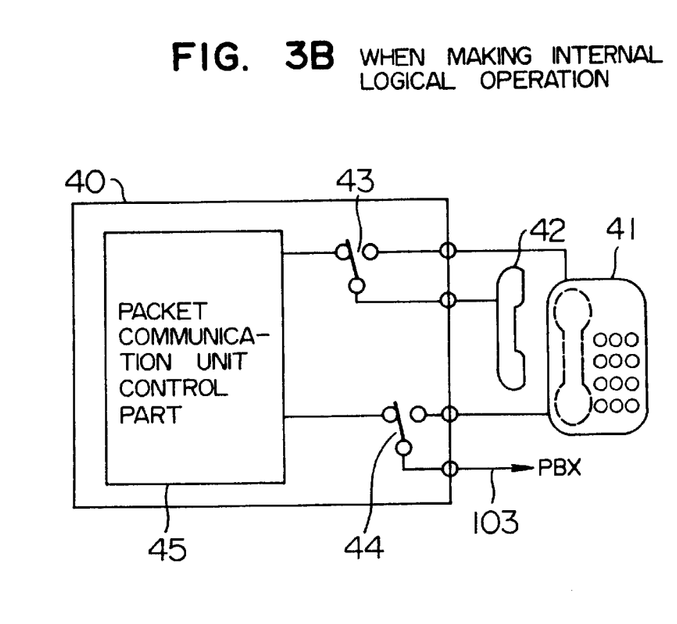

How to bypass the speech signal to an externally located telephone in the event of interruption of the power supply to the packet communication unit 30 will now be described by reference to FIGS. 3A and 3B. In FIGS. 3A and 3B, the reference numeral 40 designates a packet communication unit exhibiting a bypass function in the event of power supply interruption or down, 45 designates a control part having a function similar to that of the packet communication unit 30 shown in FIG. 2, 41 designates an externally located telephone, and 42 designates a handset of the telephone 41. The externally located telephone 41 has a power supply different from that for the packet communication unit 40. The reference numerals 43 and 44 designate relay contacts switched over under control of the processor part 31 shown in FIG. 2. More concretely, under the state in which the power supply for the packet communication unit 40 is not turned on, the relay contact 44 is switched over to the position where the connection interface line 103 is connected to the line terminal of the telephone 41 as shown in FIG. 3A, while the relay contact 43 is switched over to the position where the handset 42 is connected to the handset terminal of the telephone 41.

On the other hand, under the state in which the power supply for the packet communication unit 40 is turned on, the relay contact 44 is switched over to the position where the connection interface line 103 is connected to the line terminal of the telephone interface control part 34 shown in FIG. 2 and included in the control part 45 as shown in FIG. 3B, while the relay contact 43 is switched over to the position where the handset 42 is connected to the handset terminal of the switch part 36 shown in FIG. 2 and included in the control part 45.

By the above manner of bypass control, the externally located telephone 41 can be used to secure the speech even in the event of interruption of the power supply to the packet communication unit 40. The function of the externally located telephone 41 can be built in the packet communication unit 40 when the circuit is designed to utilize the power fed from the telephone exchange equipment.

The packet transmitted to and received from the LAN 101 in the embodiments described above may be any one of a packet having a variable length and that having a fixed length.

Although the above embodiments have been described by reference to the case where a speech signal is transmitted and received, it is apparent that the present invention is also applicable to the case of transmission and reception of a video signal or an image signal. Thus, a video telephone or the like can be connected to the conventional telephone network. In the case of transmission and reception of a video signal or an image signal, the display part 32 functions as the output unit, while an image input unit, such as, a television camera connected in place of the transmitter microphone of the handset functions as the input unit.

What is claimed is:

1. A system having a packet communication unit, wherein said packet communication unit includes a packet processor for conversion between a speech signal and packet data and for communicating the packet data through a LAN, a voice input/output interface for communicating the speech signal through a voice input/output network, and a switch for selectively connecting a voice input/output device to the packet processor or the voice input/output interface, the system comprising:

a bypass switch for selectively connecting the voice input/output network to one of the voice input/output interface and the voice input/output device and for connecting the switch to the voice input/output device; and a controller for controlling said bypass switch to automatically connect the voice input/output network to the voice input/output device when a power supply to the packet communication unit is interrupted.

2. In a system having a packet communication unit, wherein said packet communication unit includes a packet processor for conversion between a speech signal and packet data and for communicating the packet data through a LAN, a voice input/output interface for communicating the speech signal through a voice input/output network, and a switch for selectively coupling a voice input/output device to the voice input/output interface or the packet processor, a method of connecting the voice input/output network to one of the packet communication unit and the voice input/output device comprising the steps of:

connecting the voice input/output interface to the voice input/output network and connecting the switch to the voice input/output device so as to permit the packet communication unit to receive the speech signal when a power supply to the packet communication unit in not interrupted; and connecting the voice input/output network to the voice input/output device and disconnecting the switch from the voice input/output device when the power supply to the packet communication unit is interrupted so as to permit the speech signal to be received at the voice input/output device.

3. The method according to claim 2, wherein the speech signal received from the voice input/output network is transferred from the voice input/output interface to the voice input/output device via the switch.

4. A system having packet communication unit, wherein said packet communication unit includes a packet processor for conversion between a speech signal and packet data and for communicating the packet data through a LAN, a voice input/output interface for communicating the speech signal through a voice input/output network, and a switch for sending a received signal from the voice input/output network to a voice input/output device, the system comprising:

relay switch for selectively connecting the voice input/ output network to the voice input/output interface or to an externally located telephone device and for selectively connecting the voice input/output device to the switch or to the externally located telephone device; and control processor for controlling the relay switch to the position where the externally located telephone device to the voice input/output network and the voice input/ output device when there is a power supply interruption in the packet communication unit.

5. A system comprising:

a voice input/output device;

a packet communication unit;

a PBX; and a switch for automatically connecting the voice input/ output device to the packet communication unit for conversion between the speech and packet, and for communicating the packet speech data through the LAN or coupling the voice input/output device to the PBX, said switch disconnecting the voice input/output device from the packet communication unit and coupling the voice input/output device to the PBX, when communication is not possible via the LAN, so as to permit the voice input/output device to receive the speech from the PBX.

6. The system according to claim 5, wherein when the packet communication unit is not receiving power, the switch automatically disconnects the packet communication unit from the voice input/output device and couples the voice input/output device to the PBX.

7. The system according to claim 5, wherein when there is a power failure in the packet communication unit, the switch automatically disconnects the packet communication unit from the voice input/output device and couples the voice input/output device to the PBX.

8. The switch according to claims 5, wherein said switch is controlled by software.

9. A system having a packet communication unit which includes a packet processor for conversion between a speech signal and packet data and for communicating the packet data through a LAN, a voice input/output interface for communicating the speech signal through a voice input/ output network, and a switch for selectively connecting a voice input/output device to the packet processor or the voice input/output interface, the system comprising:

first switch means for-selectively connecting the voice input/output network to the voice input/output interface or an externally located telephone device;

second switch means for selectively connecting the voice input/output device to the switch or the externally located telephone device; and wherein said first switch means connects the voice input/ output network to the externally located telephone device and said second switch means connects the voice input/output device to the externally located telephone device when the packet communication unit is unavailable for communication.

10. A system comprising:

a packet communication unit;

wherein said packet communication unit includes a packet processor for conversion between a speech signal and packet data and for communicating the packet data through a packet communication network, a voice input/output interface for communicating the speech signal through a voice input/output network, and a first switch for selectively connecting said packet processor or said voice input/output interface to a voice input/ output device;

a second switch for connecting the voice input/output network to one of said voice input/output interface and the voice input/output device and for connecting said first switch to the voice input/output device; and a controller for controlling said second switch to connect the voice input/output network to the voice input/ output device, when said packet communication unit is unavailable for communication.

11. An apparatus connected to a packet communication network and a telephone network, comprising:

a packet communication part; and a bypass switch part;

wherein said packet communication part comprising:

a packet processor for conversion between a speech signal and packet data and for communicating the packet data through the packet communication network, a telephone interface for communicating the speech signal through the telephone network, and a communication switch part for selectively connecting said packet processor or said telephone interface to an externally located voice input/output device;

wherein, when a power supply to said packet communication part is not interrupted, said bypass switch part connects said telephone interface to the telephone network and connects said communication switch part to the externally located voice input/output device and, when a power supply to said packet communication part is interrupted, said bypass switch part disconnects said communication switch part from the externally located voice input/output device and connects the telephone network to the externally located voice input/ output device.

12. A switch device connected to a packet communication unit, a voice input/output device and a telephone network, wherein said packet communication unit includes a packet processor for conversion between a speech signal and packet data and for communicating the packet data through said packet communication network, a telephone interface for communicating the speech signal through said telephone network, and a communication switch for connecting one of said packet processor and said telephone interface to said voice input/output device, said switch device comprising:

- a first switch part for selectively connecting said telephone network to one of said telephone interface of said packet communication unit and said voice input/output device;
- a second switch part for connecting said communication switch of said packet communication unit to said voice input/output device; and
- wherein said second switch part disconnects said communication switch of said packet communication unit from said voice input/output device and said first switch part connects said telephone network to said voice input/output device, when a power supply to said packet communication unit is interrupted.

13. A switch connected to a packet communication unit, a voice input/output device and a telephone network, wherein said packet communication unit includes a packet processing part for conversion between a speech signal and packet data and for communicating the packet data through said packet communication network, a telephone interface part for communicating the speech signal through said telephone network, and a communication switch part for connecting one of said packet processing part and said telephone interface part to said voice input/output device, said switch comprising:

- a switch circuit having a first position where said telephone network is connected to said telephone interface of said packet communication unit and where said communication switch of said packet communication unit is connected to said voice input/output device, and a second position where said telephone network is connected to said voice input/output device; and
- wherein said switch circuit switches over from said first position to said second position when said packet communication unit is unavailable for communication.

* * * * *